Patented Apr. 23, 1929.

1,710,573

UNITED STATES PATENT OFFICE.

HERMANN GAMMAY, OF STUTTGART, GERMANY.

METHOD FOR MAKING CAMPHOR FROM BORNEOLS.

No Drawing. Application filed December 24, 1927, Serial No. 242,528, and in Germany December 30, 1926.

This invention relates to a method for making camphor from borneols.

It is known to make camphor by heating borneols in presence of metallic catalysts such as metals, metal oxides or metal salts and alkali metal or alkaline earth metal compounds.

According to my invention camphor is manufactured from borneol or isoborneol by heating these raw materials in presence of alkaline earth metal or alkali metal compounds and of graphite as catalyst. The graphite acts in the same manner catalytically as the metals or metal compounds known in the art. It has the advantage of being much more economical and of not requiring pulverization, a difficult operation inherent in the use of metals.

It is of advantage to add the whole amount of graphite, used as catalyst, not at once but in portions to the reaction mixture and to observe the oxidation process, by determining the amount of isoborneol present in the reaction mixture during the course of the reaction.

Example.

100 parts of isoborneol are dissolved in 10 parts of xylene and the solution obtained is heated, under a reflux condenser with 5 grams of graphite and 5 grams calcium hydroxide for three hours. A lively evolution of hydrogen takes place, which decreases after a heating of about two hours. When the heating period of three hours is passed, the produced camphor is separated from the solvent according to the usual methods. The resulting camphor contains 97-98% of pure camphor.

I claim:

1. A method for making camphor comprising the step of heating a borneol in presence of an alkaline reacting substance and of graphite.

2. A method for making camphor comprising the step of heating a borneol in presence of an alkaline reacting substance and of graphite, the latter being gradually added in portions to the reaction mixture.

In testimony whereof I affix my signature.

HERMANN GAMMAY.